(12) United States Patent
Verchere

(10) Patent No.: US 7,844,495 B2
(45) Date of Patent: Nov. 30, 2010

(54) METHOD AND SYSTEM FOR CONFIGURATING PRODUCTS

(75) Inventor: David Verchere, New York, NY (US)

(73) Assignee: Regency Ventures, Ltd., Hamilton, Bermuda (GB)

( * ) Notice: Subject to any disclaimer, the term of this patent is extended or adjusted under 35 U.S.C. 154(b) by 2211 days.

(21) Appl. No.: 09/838,133

(22) Filed: Apr. 20, 2001

(65) Prior Publication Data

US 2001/0047312 A1 Nov. 29, 2001

Related U.S. Application Data

(63) Continuation-in-part of application No. 09/441,204, filed on Nov. 16, 1999.

(60) Provisional application No. 60/199,834, filed on Apr. 26, 2000.

(51) Int. Cl.
*G06Q 30/00* (2006.01)
(52) U.S. Cl. .............................. 705/26; 705/27; 705/28; 705/29
(58) Field of Classification Search ................... 705/26, 705/27, 29, 28; 345/629
See application file for complete search history.

(56) References Cited

U.S. PATENT DOCUMENTS

| | | | |
|---|---|---|---|
| 3,757,037 | A | 9/1973 | Bialek |
| 4,972,318 | A | 11/1990 | Brown et al. |
| 4,992,940 | A | 2/1991 | Dworkin |
| 5,099,422 | A | 3/1992 | Foresman et al. |
| 5,109,337 | A * | 4/1992 | Ferriter et al. ................ 705/29 |
| 5,550,735 | A | 8/1996 | Slade et al. |
| 5,666,493 | A | 9/1997 | Wojcik et al. |
| 5,694,551 | A | 12/1997 | Doyle et al. |
| 5,710,887 | A | 1/1998 | Chelliah et al. |
| 5,712,989 | A | 1/1998 | Johnson et al. |

(Continued)

FOREIGN PATENT DOCUMENTS

WO 2001-089796 * 9/2000

OTHER PUBLICATIONS

Press, release, "Leed's and Littlearth Form Marketing Partnership; New Promotional Ideas Are" Licensed to thrill; PR Newswire; New York; Jan. 3, 2000.*

(Continued)

*Primary Examiner*—Yogesh C Garg
(74) *Attorney, Agent, or Firm*—Joseph P. Curtin, L.L.C.

(57) ABSTRACT

The present invention relates to a method and system for configuring products, such as branded promotional products, where products may be divided into items and processes. Item parameters and process parameters may be separately specified and linked together to create a unique product where a product identifier (e.g., SKU) may be dynamically created when the product is sourced, quoted, ordered or otherwise accessed. For example, an item may involve a product to which an imprint or logo is to be affixed. A process may involve a screening printing process or other process for affixing a customer's artwork, logo or identifier. In addition, the method and system of the present invention may be applied to other applications, such as office supplies, furniture, aviation supplies, marine supplies, interior design, beauty salon and spa supplies, medical office supplies, restaurant and bar supplies, gift shops and clothing boutique, and other industries where products and services may be ordered.

14 Claims, 15 Drawing Sheets

U.S. PATENT DOCUMENTS

| | | |
|---|---|---|
| 5,715,399 A | 2/1998 | Bezos |
| 5,721,832 A | 2/1998 | Westrope et al. |
| 5,729,594 A | 3/1998 | Klingman |
| 5,740,425 A | 4/1998 | Povilus |
| 5,742,931 A | 4/1998 | Spiegelhoff et al. |
| 5,758,328 A | 5/1998 | Giovannoli |
| 5,790,426 A | 8/1998 | Robinson |
| 5,794,217 A | 8/1998 | Allen |
| 5,799,284 A | 8/1998 | Bourquin |
| 5,825,881 A | 10/1998 | Colvin, Sr. |
| 5,832,459 A | 11/1998 | Cameron et al. |
| 5,845,263 A | 12/1998 | Camaisa et al. |
| 5,860,068 A | 1/1999 | Cook |
| 5,870,717 A | 2/1999 | Wiecha |
| 5,884,045 A | 3/1999 | Kurihara |
| 5,884,309 A | 3/1999 | Vanechanos, Jr. |
| 5,890,175 A | 3/1999 | Wong et al. |
| 5,895,454 A | 4/1999 | Harrington |
| 5,897,622 A | 4/1999 | Blinn et al. |
| 5,897,639 A | 4/1999 | Greef et al. |
| 5,903,878 A | 5/1999 | Talati et al. |
| 5,905,973 A | 5/1999 | Yonezawa et al. |
| 5,907,617 A | 5/1999 | Ronning |
| 5,918,213 A | 6/1999 | Bernard et al. |
| 5,930,768 A | 7/1999 | Hooban |
| 6,344,853 B1 * | 2/2002 | Knight ..................... 345/629 |
| 6,493,677 B1 * | 12/2002 | von Rosen et al. ............ 705/27 |

OTHER PUBLICATIONS

Turbide, David A; "Manufacturing systems", v 14n9 PP:84-90 Sep. 1996 Coden: Masyes ISSN: 0748-948X JRNL Code MFS; extracted from Dialog, file# 15 on May 4, 2009;hereinafter Turbide.*

Knowledge Representation Model For Engineering Information Circulation of Standard Parts, Umeda et al., Journal: Transactions of the Infromation Processing Society of Japan, vol. 38, No. 10, p. 1905-18, Oct. 1997.

International Search Report, International Application No. PCT/US00/30433.

Presswire, Open Market: Open Market Announces New Modular Package to Provide Lower entry-level price, Nov. 25, 1998.

proquest.uni.com, M2 Presswire. "Bemrose: New Promotional products web site sets industry standard(c) 1994-2000 M2 Communications Ltd," pp. 1-2, Apr. 2000.

U.S. Appl. No. 12/608,135, filed Oct. 29, 2009, entitled "Method And System For Configurating Products," invented by D. Verchere.

* cited by examiner

Product Configurator
Administrator

Administrator | Product Manager | Home

Product Category

Administrators, create new product and process templates

Add [ ▽ ] 310

Edit None Available 312

Delete None Available 314

Process Category

Add [ ▽ ] 320

Edit None Available 322

Delete None Available 324

FIG. 3

Product Configurator
New Corporate Gear Item Template - Mugs

Goods Categor Information - Mugs

410 — Sub Category: Travel

412 — Color: Ash, Black, Blue, Brown

414 — Material: Plastic

Quantity Break Pricing Information

| | Minimum | Maximum | | Minimum | Maximum |
|---|---|---|---|---|---|
| Sample | 1 | 2 | Break 1 | 100 | 500 |
| Break 2 | 501 | 1000 | Break 3 | 1001 | 0 |
| Break 4 | 0 | 0 | Break 5 | 0 | 0 |
| Break 6 | 0 | 0 | Break 7 | 0 | 0 |
| Break 8 | 0 | 0 | Break 9 | 0 | 0 |

— 416

Miscellaneous Pricing Information

- 418 — Misc Charge 1 ☑ $ ☐ % — per item — Name: Gift Box
- 420 — Misc Charge 2 ☐ $ ☐ % — per color — Name:
- 422 — Less Than Charge ☑ $ ☐ % — per item
- 424 — Rush Charge ☐ $ ☑ % — per job

Imprint Positions

| Front | Handle |
|---|---|
| | |
| | |

— 426

Save | Cancel

FIG. 4

Product Configurator
New Product - Mugs - Travel (Plastic)

General Information - Mugs - Travel (Plastic)

| | |
|---|---|
| Product Name | Plastic Travel Mug |
| Vendor ID Number | ABC001 |
| Item Description | Ideal for on the road thirst ▽ |
| Colors | Black / Blue / Brown |

⎬ 610

Quantity price break values
Net Pricing

| | |
|---|---|
| 1 - 2 | $15.00 |
| 100 - 500 | $9.00 |
| 501 - 1000 | $8.00 |
| 1001 - ÷ | $7.00 |

⎬ 612

Miscellaneous price break values

| | | | |
|---|---|---|---|
| Gift Box | $ | $1.00 | per item |
| Less Than Min Charge | $ | $2.00 | per item |
| Rush Charge | % | 20 | per job |

⎬ 614

Imprint Positions

☑ Front      ☐ Handle

Shipping Information

Weight per item
[ .5 ] lbs.

Weight per case
[ 50 ] lbs.

Items per case
[ 100 ]

Case width
[ 12 ] in.

Case height
[ 12 ] in.

Case Length
[ 12 ] in.

} 618

Production Time(s)

Regular Prod.
[ 14 ] working days

Rush
[ 7 ] working days

} 620

Production information

List price    $ [ $7.00 ] per item

List Description  [ Price does not include processing ]

Country of Manufacturer  [ China ▽ ]

Union Made  [ No ▽ ]

} 622

Save | Cancel | Net | Case | MSRP | Other

FIG. 6b

Product Configurator
New Process Template - Screen Printing
Administrator | Product Management | Home General Information - Screen Printing Sub Category  [Standard]  810

Number of Colors  [3 ▽]  812

Process on Material  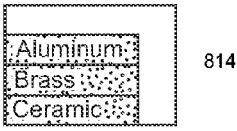  814
[Aluminum / Brass / Ceramic]

Over Imprint Size Add  ☐ $  ☑ %  ☐ Process Not Available  816

Quantity Break Pricing Information

|  | Minimum | Maximum |  | Minimum | Maximum |
|---|---|---|---|---|---|
| Break 1 | 100 | 1000 | Break 2 | 1001 | 500 |
| Break 3 | 1501 | 0 | Break 4 | 0 | 0 |
| Break 5 | 0 | 0 | Break 6 | 0 | 0 |
| Break 7 | 0 | 0 | Break 8 | 0 | 0 |
| Break 9 | 0 | 0 | Break 10 | 0 | 0 |

818

Miscellaneous Pricing Information

Set up charge  ☑
PMS Color Match  ☑
Misc Charge 1  ☑ $ ☐ %  [per color ▽]  Name [Scatter Color]
Misc Charge 2  ☐ $ ☐ %  [per color ▽]  Name [           ]
Less Than Min Charge  ☐ $ ☑ %  [per item ▽]
Rush Charge  ☐ $ ☑ %  [per item ▽]
Metallic Thread Charge  ☐ $ ☐ %  [per color ▽]
Misc Charge 3  ☐ $ ☐ %  [per color ▽]
Misc Charge 4  ☐ $ ☐ %  [per color ▽]

820

Save | Cancel

FIG. 8

Product Configurator
New Process - Screen Printing - Standard

General Information - Screen Printing - Standard

| Field | Value |
|---|---|
| Process Name | Standard Screen Printing |
| Vendor ID Number | ABC002 |
| Process Description | High Quality Screen Printing |
| Process on Material | Ceramic / Cotton / Aluminum |
| Imprint Limitations | 2 X 2 In. or larger than 12 X 12 In. |
| Over Imprint Size Add | % 20 |

1010

Quantity price break value
Net Pricing

|  | 1 Color | 2 Color | 3 Color |
|---|---|---|---|
|  | $0.50 | $0.90 | $1.30 |
| 1001-1500 | $0.40 | $0.78 | $1.10 |
| 1501 - ÷ | $0.30 | $0.65 | $0.80 |

1012

Enter your Vendor Service Station

Miscellaneous price break values

| Item |  | Value |  |
|---|---|---|---|
| Setup Charge | $ | 15.00 | per color/location |
| PMS Color Match | $ | 30.00 | per color |
| Scatter Color | $ | 8.00 | per color |
| Less than Min Charge | % | 10 | per item |
| Rush Charge | % | 20 | per item |

Product Information

| | | |
|---|---|---|
| List Price | $ [$0.30] Per item | |
| List Description | [List price is for one color one] | |
| Regular Time | [0] Business Days | |
| Rush Time | [0] Business Days | } 1016 |
| Country of Manufacturer | [United States ▽] | |
| Union Made | [Yes] | |

Save | Cancel    Net | Case | MSRP | Other |

FIG. 10b

Vendor Service Station

Product Manager

Administrator | Product Management | Home

Product Managers - Enter pricing and specifications for a product.

Small Image: [_____] Browse

Medium Image: [_____] Browse

Large Image: [_____] Browse

Upload    Cancel

FIG. 11

Product Configurator
Edit Product - Mugs - Plastic Travel Mug (Plastic)

General Information - Mugs -Plastic Travel Mug (Plastic)  Standard

| | |
|---|---|
| Product Name | Plastic Travel Mug |
| CG Number | CG800367 |
| Vendor ID Number | ABC001 |
| Item Description | Ideal for on the road thirst |
| Colors | Black, Blue, Brown |

} 1210

1212

Quantity price break values
Net Pricing

| | |
|---|---|
| 1 - 2 | $15.00 |
| 100 - 500 | $9.00 |
| 501 - 1000 | $8.00 |
| 1001 - — | $7.00 |

} 1214

Miscellaneous price break values

| | | | |
|---|---|---|---|
| Gift Box | $ 1 | per item | |
| Less Than Min Charge | $ 2 | per item | |
| Rush Charge | % 20 | per job | |

} 1216

Enter your Vendor Service Station

Imprint Positions

   ☐

Front     Handle

2 X 2     0 X 0

} 1218

  FIG. 12a

Shipping Information

Weight per item: 0 lbs.
Weight per case: 50 lbs.
Items per case: 100 lbs.

Case width: 12 in.
Case height: 12 in.
Case length: 12 in.

} 1220

Production Time(s)

Regular Prod.: 14 working days
Rush: 7 working days

} 1222

Production information

List Price: $ 7 per item
List Description: Price does not include processing
Country of Manufacturer: China
Union Made: No

} 1224

Save | Cancel | Net | Case | MSRP | Other

FIG. 12b

METHOD AND SYSTEM FOR CONFIGURATING PRODUCTS

CROSS-REFERENCE TO RELATED APPLICATION

This application is related to, and a continuation-in-part of, U.S. application Ser. No. 09/441,204, filed Nov. 16, 1999, and U.S. Provisional Application Ser. No. 60/199,934, filed Apr. 26, 2000, which are incorporated by reference.

FIELD OF INVENTION

The present invention relates to a method and system for configuring products (e.g., branded promotional products) where products may be divided into items and processes wherein item and process parameters may be separately specified and linked together to create a unique product where a product identifier (e.g., SKU) may be dynamically created when the product is sourced, quoted, ordered or otherwise accessed.

BACKGROUND OF THE INVENTION

Promotional products have widely been used to promote a brand name or image, build customer awareness and/or announce a presence in an industry. Branded promotional products may include advertising, sales promotion and marketing communications media. These products generally include various types of merchandise imprinted with an advertiser's identification, message or logo. The branded promotional products sector of the advertising industry provides unique marketing opportunities. Branded products are easy to understand and useful in meeting many marketing objectives, such as announcing a name change or building a company image.

Customers seek high quality products that effectively promote their brand and logo. They want a useful product obtained through a convenient transaction. However, customers are often frustrated because they have to rely on a reseller (or distributor) for purchasing options and the flow of information. Generally, resellers are expected to find customers favorable prices, produce samples and ensure timely delivery.

Currently, vendors have little or no contact with customers and rely on resellers (or distributors) to reach customers. Vendors spend significant amounts of effort and money providing price quotes and samples to resellers (or distributors). It is difficult for vendors to gather product or customer market research, customer buying pattern information, and other customer related information.

Traditionally, the promotional products industry has operated under a linear supply-chain model of distribution. Typically, a customer hires a reseller (or distributor) to assist in selecting a branded product for an event or promotion. The reseller locates the desired merchandise through established vendor partner relationships. The vendor manufacturers or imports the items, adds the brand, and ships the product. In addition, a second vendor may add the process which may include branding. Business service partners provide services such as shipping, financing, and insurance. Media partners deliver educational and other useful information. Similar problems arise in other industries as well.

Currently, a standard method for purchasing products (e.g., branded promotional products) has been difficult to implement due to the uniqueness of products and enormous number of possible product and process combinations. For example, a company or other entity may regularly purchase promotional products for advertisement, brand awareness and other purposes. In addition, a company may promote new products on a regular basis and make frequent improvements on current products. Therefore, repeated orders for promotional products may be required for similar products with different printing processes, for example. Similarly, the same or similar printing process may be used on different products. Due to the overlap in items and processes, inefficiencies may occur when ordering promotional or other products, especially when orders are frequently repeated. Typically, each process is stored with each item. As a result, it may become inefficient and redundant to store each process with each item when the processes may be the same or similar.

Oftentimes, a vendor (or distributor) may attempt to define all possible product stock keeping units ("SKUs") when presenting promotional products options to a customer. An SKU is a number or identifier associated with a product for inventory purposes. This creates inefficiencies and duplicated efforts because the product does not become a SKU until the item and process are combined. Presently, there is no standard method of specifying promotional products because they are so varied and numerous.

In other industries, a service or product provider may order supplies and inventory on a regular basis. Such industries may include office supplies, furniture, aviation supplies, marine supplies, interior design, beauty salon and spa supplies, medical office supplies, restaurant and bar supplies, gift shops and clothing boutique, and other industries where orders for various products or requests for services may be placed. Similarly, inefficiencies develop due to the overlap of analogous orders and purchases over time.

These and other drawbacks exist with current systems.

SUMMARY OF THE INVENTION

An object according to the present invention is to overcome these and other drawbacks with existing systems.

Another object of the invention is to provide a standard method and system for configurating products where separate parameters for item and process may be identified.

Another object of the invention is to create SKUs (or other product identifiers) dynamically by separating products into items and processes (or other categories), specifying item parameters, specifying process parameters, dynamically linking an item and process and creating a SKU when the product is sourced, quoted, or ordered.

Another object of the invention is to apply the method and system of the present invention to the fields of branded promotional products, office supplies, furniture, aviation supplies, marine supplies, interior design, beauty salon and spa supplies, medical office supplies, restaurant and bar supplies, gift shops and clothing boutique. Other applications may be available for industries where orders for various products or requests for services may be placed.

The present invention provides the ability to link manufacturers, distributors and end-use corporations to the industry's complete e-marketplace. The present invention gives manufacturers and distributors the tools to sell more and spend less by taking advantage of the efficiency of e-commerce, while preserving the traditional methods of doing business. The present invention may use live data thereby making transactions more efficient, accurate and less complicated. The present invention enables manufacturers and distributors to maintain and control the product prices displayed on their web sites as well as the prices seen by individual customers.

In addition, manufacturers, distributors and other users may create custom web sites for individual markets and companies.

Other objects and advantages of the present invention will be apparent to one of ordinary skill in the art upon reviewing the specification herein.

BRIEF DESCRIPTION OF THE DRAWINGS

FIG. 3 is an example of a screen shot of an administrator page of a product configurator according to an embodiment of the present invention.

FIG. 4 is an example of an item template according to an embodiment of the present invention.

FIGS. 6a and 6b are an example of an item definition page according to an embodiment of the present invention.

FIG. 8 is an example of a process template according to an embodiment of the present invention.

FIGS. 10a and 10b are an example of a process definition page according to an embodiment of the present invention.

FIG. 11 is an example of an image upload page according to an embodiment of the present invention.

FIGS. 12a and 12b are an example of an item definition page edit according to an embodiment of the present invention.

DETAILED DESCRIPTION OF THE PREFERRED EMBODIMENTS

Promotional products may include useful or decorative merchandise imprinted with an advertiser's identification, message or logo artwork. Various processes may be used to imprint artwork on a vast array of items and materials. Generally, promotional products may consist of two or more components, which may include an item (e.g., a mug) and a process (e.g., screen printing). Other features or components may be specified. A customer's artwork used in the imprint process may include specifications such as number of colors, imprint locations on the item, imprint sizes and other details.

In addition, the method and system of the present invention may be applied to other applications, such as office supplies, furniture, aviation supplies, marine supplies, interior design, beauty salon and spa supplies, medical office supplies, restaurant and bar supplies, gift shops and clothing boutique, and other industries where products and services may be ordered.

A method and system of the present invention may create SKUs (or other identifiers) dynamically. For example, products may be separated into items and processes. Item parameters may be specified. Process parameters may also be specified separately. The item and process parameters may then be linked to create a SKU (or other identifier) when the product is sourced, quoted, ordered, or otherwise accessed. Categories of items and processes may be defined for different industries. For example, in the field of office supplies, item categories may include pens, staplers, paper, telephones, and other office supplies. Process categories may include manufacturing processes and other processes associated with office supplies. For example, an item may include a chair while a process may include a method for covering. Options related to chairs may include structural factors, such as height, width, etc. Other options may include swivel ability, arm rest features, etc. In addition, various details may be associated with the covering process, such as material, color, type of process and other factors. Since the same process may be applied to multiple items, such as other types of furniture (e.g., sofas, ottoman, etc.), besides office chairs, it is more efficient to store the process once instead of with each applicable item.

Figure 1:
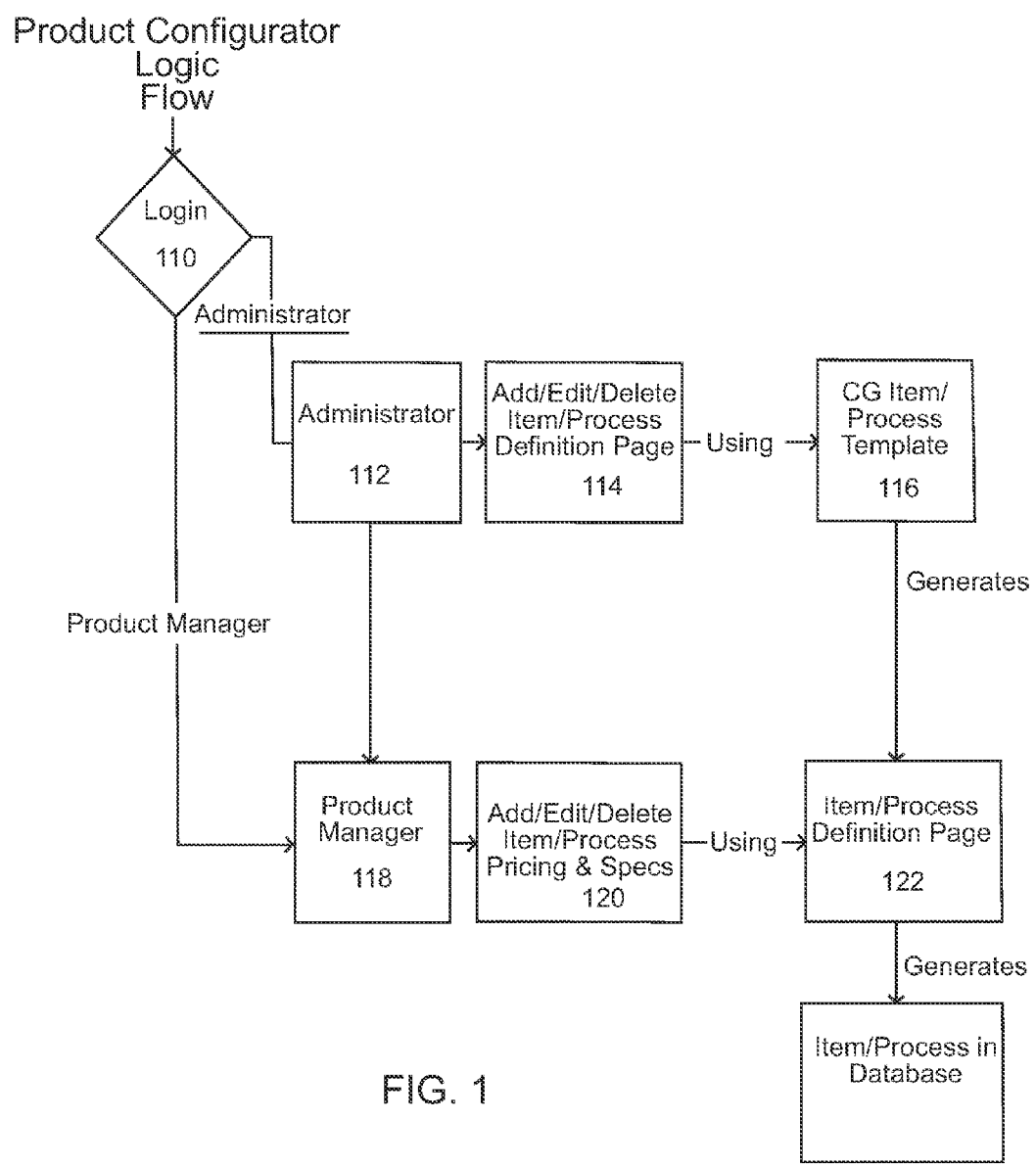
FIG. 1 is a flow diagram of an item and process specification method according to an embodiment of the present invention.

The present invention may separate the item and process specification methods into various levels using templates, as shown in FIG. 1. A user may access the method and system of the present invention by logging in to the system at 110. Standard item or process templates may be supplied through the present invention. A vendor administrator 112 (or other entity) may create item or process definition pages 114 based on the standard item or process templates 116. A vendor product manager 118 (or other entity) may enter the item or process specifications and pricing information 120 using the item or process definition pages 122. Items and processes may then be searched and matched based on materials or other specifications and stored in a database, at 124. A specific item template may be used in conjunction with several types of items with similar characteristics. Similarly, a specific process template may be used for several types of processes with similar characteristics or functions.

Another feature of the present invention includes a pricing algorithm. The pricing algorithm may depend on the item and associated processes chosen. In general, the pricing may be based on the item and process production specifications. The manufacturing specifications for a particular promotional product may not exist until an entity has specified item parameters, process parameters, a client's artwork parameters, and other specifications. According to another feature of the present invention, manufacturers may go online and update their own pricing anytime so distributors may know that the price they see is the correct and most recent price. The present invention may assist the user in assessing an accurate cost with extra charges, such as setup charges, run charges, and even shipping charges.

To assist in defining items and processes, the present invention may provide tables of standard data used throughout the industry for standardization. Examples may include industry colors, materials, extra charges, and other data. In addition, the present invention may add and modify colors as they are required or requested by vendors to offer a complete selection of options.

Figure 2:
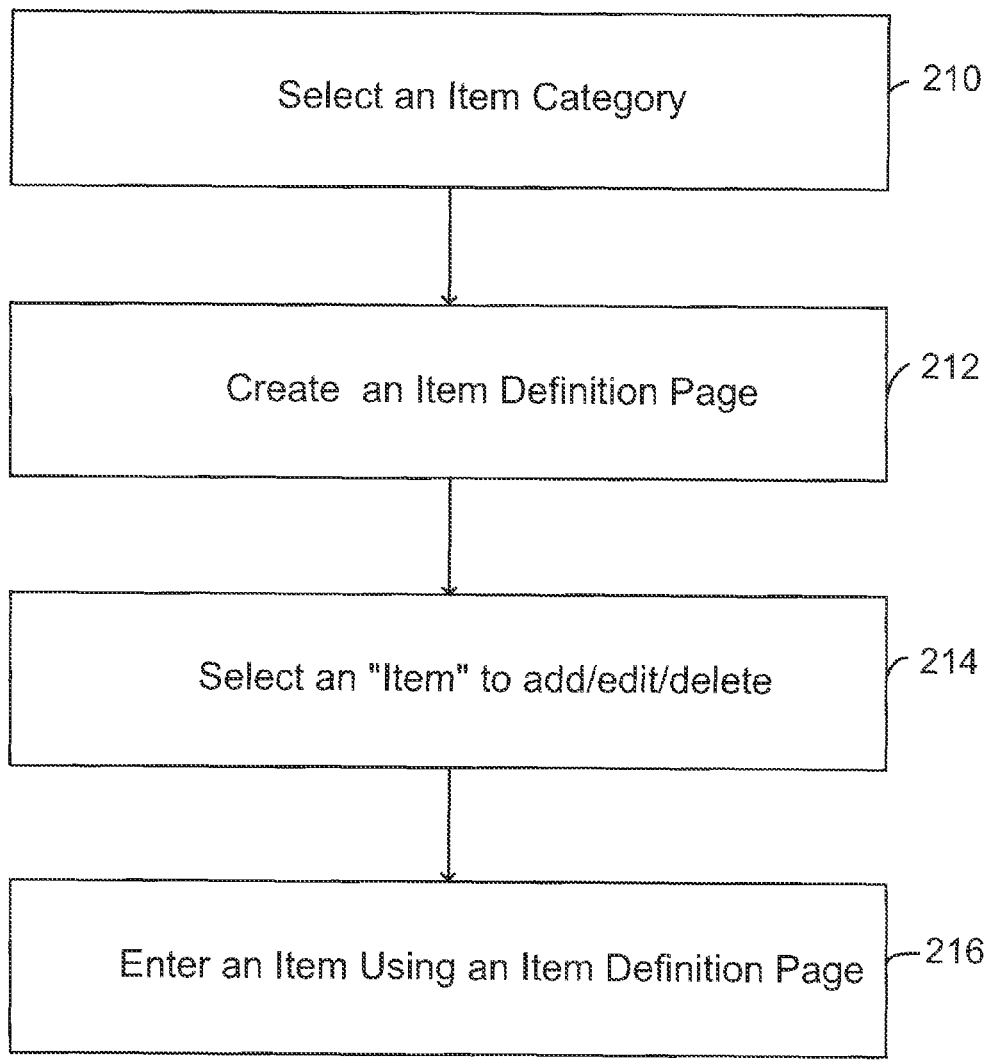
FIG. 2 is an example of a flowchart related to item templates and data entry according to an embodiment of the present invention.

FIG. 2 is an example of a flowchart related to item templates and data entry according to an embodiment of the present invention. At step 210, a user may select an item category. Item categories may include mugs, T-shirts, and baseball caps, for example. At step 212, the user may create an item definition page by using an item template for the selected item category. An item template may be provided for each item category. In addition, the template may be supplied by a vendor or other entity. This feature enhances consistency and uniformity where similarities may be easily identified. For example, a single item template may be used for numerous item categories. For example, mugs and stress balls may use the same (or similar) item template. At step 214, a user may select an "item" definition to add, edit, delete or perform other operations. At step 216, the user may enter an item using an item definition page. In addition, a template for item definition data entry may be supplied by a vendor or other entity.

FIG. 3 is an illustration of step 210 according to an embodiment of the present invention. This feature of the invention enables an entity to create general item and process templates for a product line from templates. An entity, such as an administrator, may select an item category to add an item definition page into a database. For example, item category options may include add, edit, delete and other operations. By selecting the add option 310, a list of available item categories may be displayed. Item categories may include mugs, T-shirts, baseball caps and other categories. The drop down list may contain a list of item categories associated with item templates available through the present invention. Selecting an item category takes the user to an associated item template page for that category. By selecting the edit or delete options 312 or 314, a list of existing item definition pages may be displayed. By selecting an item definition page, associated item templates with specifications previously entered may be displayed and edited.

FIG. 4 is an illustration of step 212 according to an embodiment of the present invention. Using the selected item template for the item category, a user may create an item definition page for the selected category. An entity, such as an administrator, may create an item definition page using an item template. The administrator (or other entity) may specify the descriptive and pricing characteristics applicable to the item being sold or promoted. The administrator may create several item definition pages using the same item template for efficiency and uniformity purposes. For example, the item template "Mug" may generate item definition pages for "Mugs—Standard (steel)" or "Mugs—Travel (plastic)". Other item definition pages may also be generated. According to another embodiment of the present invention, each item definition page may specify one or more materials. Other variations exist.

In the example of FIG. 4, the category "mugs" has been selected. At line 410, a sub category may be identified. For example, in association with the category "mugs", subcategories may include "travel" or "standard". At line 412, colors may be identified and/or selected from a list of available colors and/or patterns. At line 414, material for the mugs may be identified and/or selected from a list of available materials. Various color and/or material combinations may also be identified. The size and variables within a pricing matrix of the present invention may vary according to the type of item or process and specifications made by the administrator (or other entity) on the item or process template.

Quantity break pricing information may be specified in section 416. Miscellaneous pricing information may also be identified. For example, a charge may be applied per item as well as per color, as shown by lines 418, 420 and 421. Other miscellaneous charges may be applied as needed by a product or process involved. In addition, additional pricing information may also be identified. If the order is less than a predetermined minimum charge, an additional charge may be applied, as shown by line 422. For rush orders, a rush charge may be added, as shown by line 424. For each additional charge, the amount may be a dollar amount or a percentage of the order amount. In section 426, the user may specify one or more imprint positions, such as front, handle, back, side, etc. Other locations may also be specified, depending on the type of item selected. Other charges may be defined by the administrator (or other authorized entity).

Figure 5:
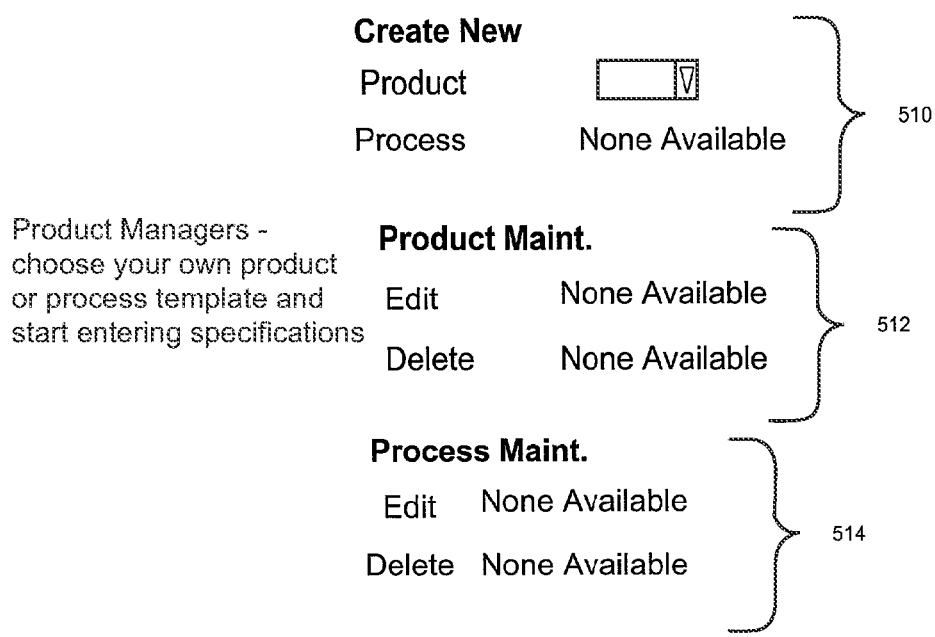
FIG. 5 is an example of a product manager page according to an embodiment of the present invention.

FIG. 5 is an illustration of step 214 according to an embodiment of the present invention. A user may specify individual items from previously created templates. Processes offered on one or more items may also be specified from previously created templates. A user may select an "item" to add, edit, delete and perform other operations. For a new item, the present invention may display a dropdown window of existing item or process definition pages, as shown by 510. A "select" option may take the user to the item definition page previously created by the administrator (or other entity). For an existing item, the user may perform various operations, such as edit and delete, as shown by 512 and 514. A dropdown of existing items in the present invention may be displayed. A "select" option may display the existing item data.

FIGS. 6a and 6b are an illustration of step 216 according to an embodiment of the present invention. A user may enter an item using an item definition page containing a vendor's range of parameters for the selected one or more items. The user may then enter specifications for each unique item. For example, in section 610, general information may be entered, such as product name, vendor ID number, item description, and colors. Other information may also be specified. In section 612, quantity price break values may be specified. For example, the first two items ordered (e.g. samples) may be charged at $15.00. The user may lower the price for each item if a purchaser orders in bulk. For example, if the purchaser orders 500 items, each item may be priced at $9.00. If the purchaser orders 1002 items, each item may be priced at $7.00. In section 614, miscellaneous price break values may be specified, such as gift box, less than minimum charge, and rush charges. These prices may be a dollar amount or a percentage of the entire order. There may also be instances where miscellaneous price breaks may not be applicable. In these instances, an "N/A" box may be selected. In section 615, the user may select one or more allowable processes that may be processed on the indicated one or more items. The user may also select multi colors and/or patterns.

In section 616, imprint positions may be specified. The location of the imprint as well as the size (height and width) may be indicated. Imprint positions may include one or more of front, handle, side, back and other locations as made available by the product selected. There may also be situations where an item cannot be imprinted. This may be indicated by selecting an appropriate box at 616a. In section 618, shipping information may include weight and case specifications, such as weight per item; weight per case; items per case; case width; case height; and case length. In section 620, production time information may be identified. For example, regular production may take 14 working days. A rush order may take 7 working days. Other options may be available. In section 622, production information may be specified. This information may include list price; list description; country of manufacturer, whether the item is union made or not, and other details.

Figure 7:
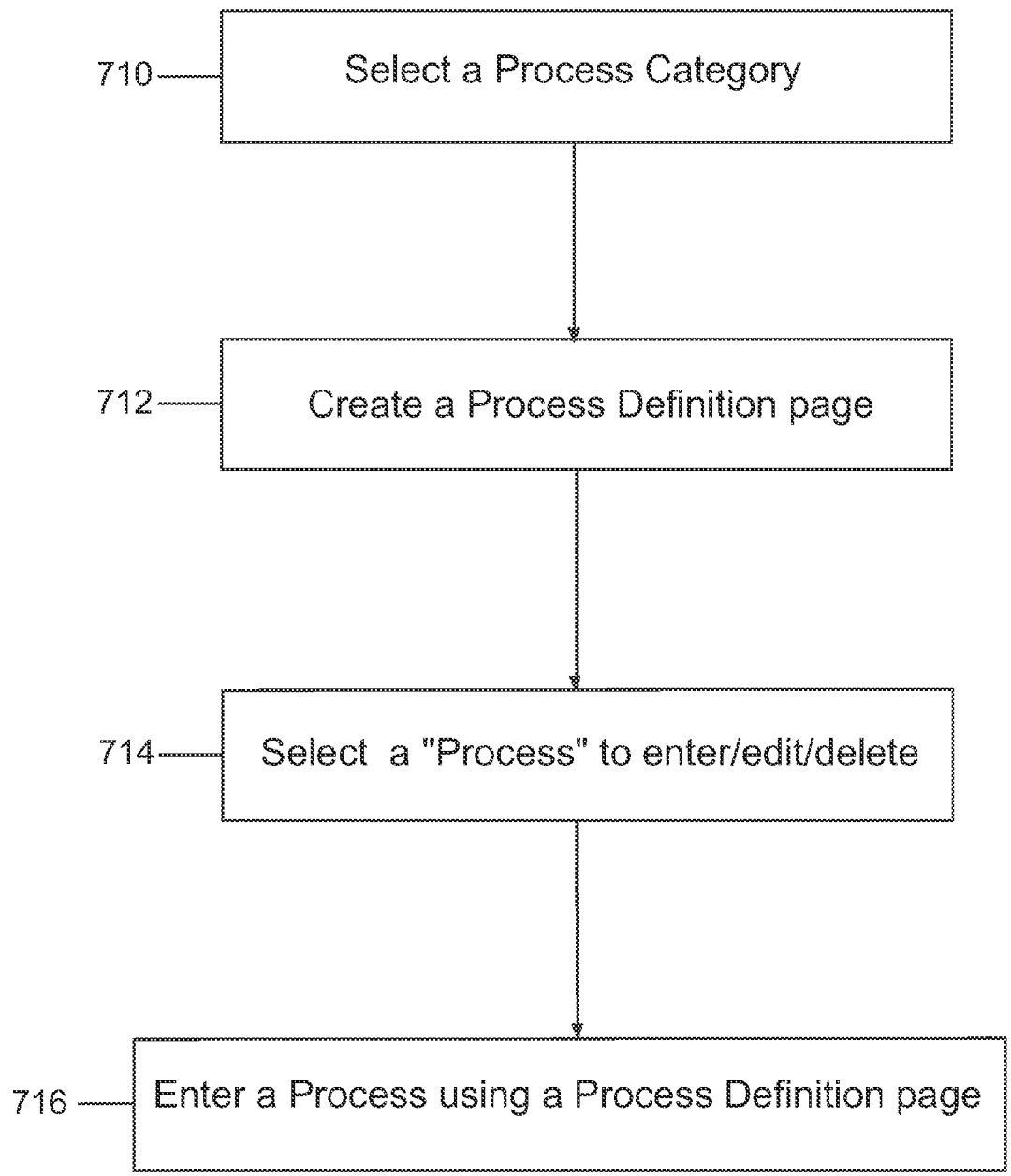
FIG. 7 is an example of a flowchart related to process templates and data entry according to an embodiment of the present invention.

FIG. 7 is an example of a flowchart related to process templates and data entry according to an embodiment of the present invention. At step 710, a user may select a process category. Process categories may include screen printing, pad printing and etching, for example. At step 712, the user may create a process definition page by using a process template for the selected process category. A process template may be provided for several process categories. This feature enhances consistency and uniformity where similarities may be easily identified. For example, screen printing and pad printing may use the same (or similar) process template. In addition, the template may be supplied by a vendor or other entity. At step 714, a user may select a "process" to add, edit, delete or perform other operations. At step 716, the user may enter a process using a process definition page. In addition, a template for process definition data entry may be supplied by a vendor or other entity.

FIG. 3 is an illustration of step 710 according to an embodiment of the present invention. This feature of the invention enables an entity to create general item and process templates for a product line from templates. An entity, such as an administrator, may select a process category to add a process definition page into a database. For example, process category options may include add, edit, delete and other operations. By selecting the add option 320, a list of available process categories may be displayed. Process categories may include pad printing, screen printing, etching and other categories. The drop down list may contain a list of process categories associated with process templates available through the present invention. Selecting a process category takes the user to an associated process template page for that category. By selecting the edit or delete options 322 or 324, a list of existing process definition pages may be displayed. By selecting a process definition page, associated process templates with specifications previously entered may be displayed or edited.

FIG. 8 is an illustration of step 712 according to an embodiment of the present invention. Using the selected process template for the process category, a user may create a process definition page for the selected category. An entity, such as an administrator, may create a process definition page using a process template. The administrator (or other entity) may specify the descriptive and pricing characteristics applicable to the process used to display the logo or advertisement. The administrator may create several process definition pages using the same process template for efficiency and uniformity purposes. According to another embodiment of the present invention, process template and definition pages may be associated with one or more materials. Other variations exist.

In the example of FIG. 8, the category "screen printing" has been selected. At line 810, a sub category may be identified. For example, in association with the category "screen printing", an example of a subcategory may include "standard". At line 812, the user may specify the number of colors involved in designing the logo or advertisement. At line 814, the material to be processed on may be identified. An additional charge for over imprint size may be applied at line 816. Quantity break pricing information may be specified in section 818. Miscellaneous pricing information may also be identified in section 820. For example, miscellaneous pricing information may include a setup charge, PMS color match, one or more miscellaneous charges for additional or special colors, less than minimum charge, rush charge, metallic thread charge, moving screen and other services. Other pricing for processes may include personalization charges, production proof charges, and paper proof charges.

According to an embodiment of the present invention, pricing for processes may include run charges, setup charges, and other additional charges. These charges and the variables affecting them may vary depending on the type of process (e.g., the process template used to create the process definition page). The run and setup charges may use matrices to enter pricing information. The size and variables within the pricing matrices may vary according to the type of process and specifications made by the administrator (or other entity) on the process template. For example, embossing may have a run charge based on quantity breaks and number of colors per location. In another example, embroidery may have a run charge based on quantity and number of stitches. Other factors and limitations may be applied based on the type or characteristics of process.

Figure 9:
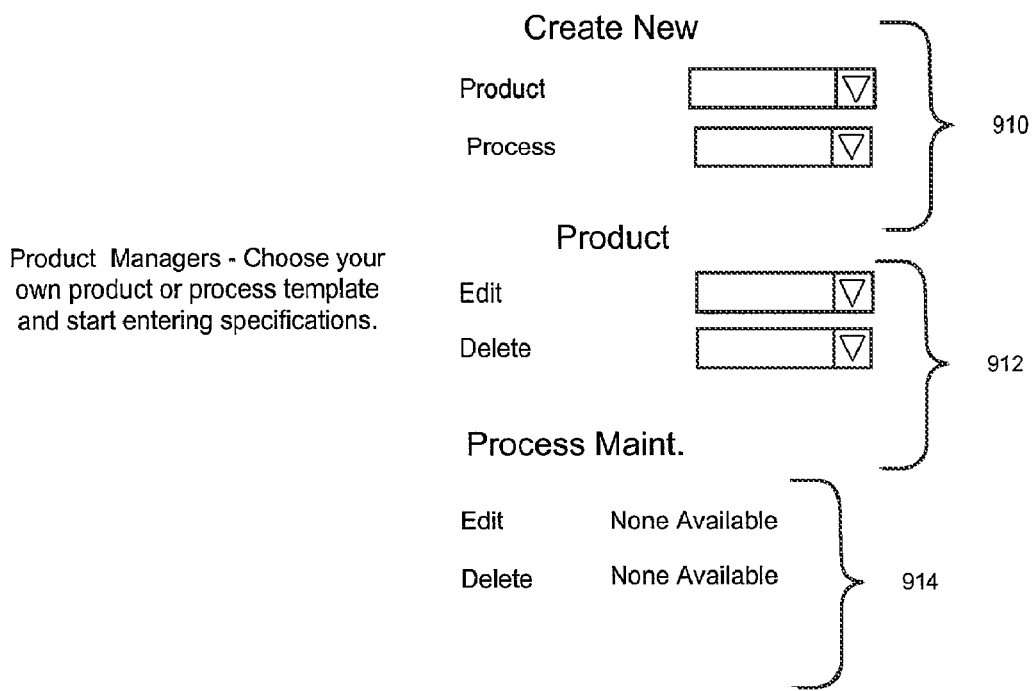
FIG. 9 is an example of a product manager page according to an embodiment of the present invention.

FIG. 9 is an illustration of step 714 according to an embodiment of the present invention. A user may select a "process" to add, edit, delete and perform other operations. For a new process, the present invention may display a dropdown window of existing item or process definition pages, as shown by 910. A "select" option may take the user to the item definition page previously created by the administrator (or other entity). For an existing process, the user may perform various operations, such as edit and delete, as shown by 912 and 914. In addition, a dropdown of existing processes in the present invention may be displayed. A "select" option may display the existing process data.

FIGS. 10a and 10b are an illustration of step 716 according to an embodiment of the present invention. A user may enter a process using a process definition page containing a vendor's range of parameters for the selected one or more processes. The user may then enter specifications for each unique process. For example, in section 1010, general information may be entered, such as process name, vendor ID number, process description, process on material, imprint limitations and over imprint size addition. Other information may also be specified. In section 1012, quantity price break values may be specified. For example, for each additional color, there may be an additional charge. Also, the price for each color may be lower if the purchasers orders a larger quantity. In section 1014, miscellaneous price break values may be specified, such as setup charge, PMS color match, scatter color, a less than minimum charge, and rush charges. Other miscellaneous price break values may include a personalization charge, paper proof charge, production proof charge, moving screen and other options. These prices may be a dollar amount or a percentage of the item. Other variations exist. In section 1016, production information may be specified. This information may include list price per item; list description; regular production time, rush production time, country of manufacturer, whether the item is union made or not, and other details.

FIG. 11 is an example of an image upload feature according to an embodiment of the present invention. When saving an image or page, the user may be presented with an option to upload an image. The user may upload one or more item or process images. The user may select a small, medium or large image view, at section 1110. This options enables the user to view placement of the logo or other artwork on the selected item.

FIGS. 12a and 12b are an example of an item or process edit page according to an embodiment of the present invention. A product manager (or other authorized entity) may edit an item information page, for example. Each product may be assigned a number by the present invention, under "CG Number", for example. The existing item or process information may be displayed in the item or process definition page. The user may then modify the information displayed. General information may be modified in section 1210, which may include product name, vendor id number, item description, and colors. An image of the product with a customer's logo or artwork may be shown at 1212. Quantity price break values may also be modified in section 1214.

Miscellaneous price break values may be changed in section 1216. Other miscellaneous information may include one or more of setup charge, PMS color match, personalization charge, paper proof charge, production proof charge, moving screen, gift box, less than minimum charge, a rush charge and other information. Such charges may also be indicated as not being applicable to the selected process or product.

Imprint locations may be altered by the user, at section 1218. Other information, such as over imprint size charge, may also be specified. Detailed shipping information may be modified by the user in section 1220. Production times may be changed, at section 1222. Also, production information data may be altered, at section 1224. Clicking on the image 1212 may link the user to an image upload page, as shown in FIG. 11.

Other embodiments and uses of the invention will be apparent to those skilled in the art from consideration of the specification and practice of the invention disclosed herein. The specification and examples should be considered exemplary only.

What is claimed is:

1. A computer implemented method for configuring one or more products over a computer network, the computer implemented method comprising:
    storing product parameter data and a pricing algorithm on a data storage device such that the data storage device is accessible by a product parameter identifying and pricing computer and user interface device connected to said computer network;
    displaying on said user interface device a graphical user interface (GUI) comprising representations of said product parameter data obtained from said data storage device over said computer network;
    creating a request over said computer network for a branded product wherein a user designates features for said branded product by selecting product parameter data displayed by the GUI and submits said features to said product parameter identifying and pricing computer over said computer network;
    separating said request for a branded product using said product parameter identifying and pricing computer into at least an item, a process, and an artwork;
    identifying one or more item parameters, one or more process parameters, and one or more artwork parameters using said product parameter identifying and pricing computer;
    applying said pricing algorithm using the product parameter identifying and pricing computer to assign a price to the branded product, wherein the price is dynamically generated using the one or more item parameters, one or more process parameters, and one or more artwork parameters identified using said product parameter identifying and pricing computer;
    linking said one or more item parameters, said one or more process parameters and said one or more artwork parameters using said product parameter identifying and pricing computer;
    dynamically generating a product identifier using the product parameter identifying and pricing computer when the product is sourced, quoted or ordered, wherein the product identifier is defined by a combination of the product's one or more item parameters, one or more process parameters, one or more artwork parameters and said price; and
    branding the product as requested using the product parameter identifying and pricing computer, wherein the product is identified by the product identifier.

2. The method of claim 1 wherein separating the product further comprises supplying an item template.

3. The method of claim 2 wherein separating the product further comprises creating an item definition page based on the item template.

4. The method of claim 1 wherein separating the product further comprises supplying a process template.

5. The method of claim 4 wherein separating the product further comprises creating a process definition page based on the process template.

6. The method of claim 1 wherein the one or more item parameters comprise description information.

7. The method of claim 1 wherein the one or more process parameters comprise quantity break pricing information.

8. A computer implemented system for configuring one or more products over a computer network, the computer implemented system comprising:
    a data storage device hosting product parameter data and pricing data, addressable on said computer network, and accessible by a remote user on a user interface device comprising a user input means and a display;
    a product parameter identifying and pricing computer comprising a branded product creation module operable to generate a graphical user interface (GUI), the branded product creation module comprising:
        a GUI generation engine operable to generate a GUI representing product parameter data hosted on said data storage device and display said GUI on said display of said user interface device;
    an ordering module operable to create a request over said computer network for a branded product wherein a user designates features for said branded product by selecting product parameter data represented by the GUI and submits said features to said product parameter identifying and pricing computer over said computer network;
    a separating module operable to separate said request for the branded product into at least an item, a process and an artwork;
    an identifying module operable to identify one or more item parameters, one or more process parameters and one or more artwork parameters;
    a linking module operable to link said one or more item parameters, said one or more process parameters and said one or more artwork parameters;
    a pricing algorithm used to assign a price to said branded product wherein the price is dynamically generated by said product parameter identifying and pricing computer using the one or more item parameters, one or more process parameters, one or more artwork parameters;
    a generating module operable to dynamically generate a product identifier when the product is sourced, quoted or ordered, wherein the product identifier is defined by a combination of the product's one or more item parameters, one or more process parameters, one or more artwork parameters, and price; and
    a branding module for branding the product as requested, wherein the product is identified by the product identifier.

9. The system of claim 8 wherein the separating module further comprises an item template supplying module.

10. The system of claim 9 wherein the separating module further comprises an item definition page creation module operable to create an item definition page wherein the item definition page is based on the item template.

11. The system of claim 8 wherein the separating module further comprises a process template supplying module.

12. The system of claim 11 wherein the separating module further comprises a process definition page creation module operable to create a process definition page wherein the process definition page is based on the process template.

13. The system of claim 8 wherein the one or more item parameters comprise description information.

14. The system of claim 8 wherein the one or more process parameters comprise quantity break pricing information.

* * * * *

UNITED STATES PATENT AND TRADEMARK OFFICE
CERTIFICATE OF CORRECTION

| | | |
|---|---|---|
| PATENT NO. | : 7,844,495 B2 | Page 1 of 1 |
| APPLICATION NO. | : 09/838133 | |
| DATED | : November 30, 2010 | |
| INVENTOR(S) | : David Verchere | |

It is certified that error appears in the above-identified patent and that said Letters Patent is hereby corrected as shown below:

In column 10, line 9, in claim 8, delete "data," and insert --data-- therefor; and In column 10, line 38, in claim 8, delete "using the one" and insert --using one-- therefor.

Signed and Sealed this
Twenty-fifth Day of January, 2011

David J. Kappos
*Director of the United States Patent and Trademark Office*